(12) United States Patent
Chae et al.

(10) Patent No.: US 8,717,389 B2
(45) Date of Patent: May 6, 2014

(54) PROJECTOR ARRAY FOR MULTIPLE IMAGES

(75) Inventors: Sangwon Chae, Irvine, CA (US);
Yasuhiro Komori, Irvine, CA (US);
Hung Khei Huang, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 12/852,414

(22) Filed: Aug. 6, 2010

(65) Prior Publication Data

US 2012/0032978 A1 Feb. 9, 2012

(51) Int. Cl.
*G06T 3/00* (2006.01)

(52) U.S. Cl.
USPC .............................. 345/644; 353/30

(58) Field of Classification Search
CPC ............................. G06T 3/0006; H04N 9/3147
See application file for complete search history.

(56) References Cited

U.S. PATENT DOCUMENTS

| | | | |
|---|---|---|---|
| 6,755,537 B1 | 6/2004 | Raskar et al. | 353/94 |
| 6,811,264 B2 | 11/2004 | Raskar et al. | 353/94 |
| 7,119,833 B2 | 10/2006 | Jaynes et al. | 348/189 |
| 7,239,331 B2 | 7/2007 | Chernichenko et al. | 345/647 |
| 2004/0184010 A1* | 9/2004 | Raskar et al. | 353/94 |
| 2008/0002160 A1 | 1/2008 | Chang et al. | 353/94 |
| 2008/0062164 A1 | 3/2008 | Bassi et al. | 345/214 |
| 2008/0100805 A1 | 5/2008 | Majumder et al. | 353/30 |
| 2008/0143969 A1 | 6/2008 | Aufranc et al. | 353/30 |
| 2008/0291402 A1 | 11/2008 | Kobayashi | 353/69 |
| 2009/0027629 A1* | 1/2009 | Yonezawa | 353/70 |
| 2009/0113307 A1* | 4/2009 | MacKenzie | 715/732 |
| 2009/0115915 A1 | 5/2009 | Steinberg et al. | 348/745 |
| 2010/0277655 A1* | 11/2010 | Sun | 348/744 |

* cited by examiner

*Primary Examiner* — Kee M Tung
*Assistant Examiner* — Ryan D McCulley
(74) *Attorney, Agent, or Firm* — Fitzpatrick, Cella, Harper & Scinto

(57) ABSTRACT

A centralization point in a projection area is designated. The projection area is on a projection surface onto which images are projected by a projector array, which includes a plurality of projectors. A first image is projected in a first maximum area rectangle at a first aspect ratio of the first image, and the first image is projected into the projection area centered at the centralization point. A second image is projected in a second maximum area rectangle at a second aspect ratio of the second image, and the second image is projected into the projection area centered at the centralization point.

15 Claims, 5 Drawing Sheets

PROJECTOR ARRAY FOR MULTIPLE IMAGES

BACKGROUND

1. Field

The present disclosure relates to image projection and, more specifically, to display of multiple images by a projector array into a projection area on a projection surface.

2. Background

Keystone correction is typically used to correct an image being projected by a projection system, in which the image would otherwise be distorted principally due to an angle of projection from the projection system to the projection surface (e.g., projection screen). Typically, keystone correction is applied to a projection system so as to obtain a homography transformation that results in good image fidelity between a source image and a projected image. When the projection system includes multiple projectors in a projector array, the homography transformation is ordinarily derived for a single object, regardless of the number of objects actually formed by the projection system.

As such, using keystone correction in a projection system with multiple projectors in a projector array may cause image distortion and distraction for viewers. Accordingly, there is a desire to improve image quality when performing such keystone correction.

SUMMARY

Disclosed embodiments describe the display of images with a projector array comprising a plurality of projectors. Images are projected into a projection area so as to maintain the center of the projected images at a fixed centralized point, which is used for all of the multiple images, while also projecting the images at the aspect ratio of each image and at their largest size within the projection area.

Thus, in an example embodiment described herein, a projector array includes a plurality of projectors, which together, project images into a projection area on a projection surface. A centralization point in the projection area is designated. A first image is projected in a first maximum area rectangle at a first aspect ratio of the first image, and the first image is projected into the projection area centered at the centralization point. A second image is projected in a second maximum area rectangle at a second aspect ratio of the second image, and the second image is projected into the projection area centered at the centralization point.

By virtue of this arrangement, it is ordinarily possible to project one or more images with reduced keystone distortions while automatically centering the projected images at an identified centralized point, while also providing dynamic aspect ratio adjustment such that the images are at their maximum size, scaled at their respective aspect ratio, and projected within the projection area.

In example embodiments, the projection area is detected by corner detection using an image capture device which captures an image of the projection surface. The image capture device can include a camera, such as a digital camera.

In other example embodiments, the first maximum area rectangle is determined at the first aspect ratio within the projection area. The center of the first maximum area rectangle is identified as the centralization point. The second maximum area rectangle is determined at the second aspect ratio within the projection area. The second maximum area rectangle is determined by calculations using the second aspect ratio and the centralization point, so as to result in a substantially maximum area within the projection area centered at the centralization point.

In yet other example embodiments, a first homography matrix is determined based on the determination of the first maximum area rectangle. A first inverse homography matrix transform is applied to the first homography matrix, and a first homography-transformed image of the first image is obtained based on the first inverse homography matrix and the first aspect ratio. a second homography matrix is determined based on the determination of the second maximum area rectangle. A second inverse homography matrix transform is applied to the second homography matrix, and a second homography-transformed image of the second image is obtained based on the second inverse homography matrix and the second aspect ratio.

This brief summary has been provided so that the nature of this disclosure may be understood quickly. A more complete understanding can be obtained by reference to the following detailed description and to the attached drawings.

DETAILED DESCRIPTION

Figure 1:
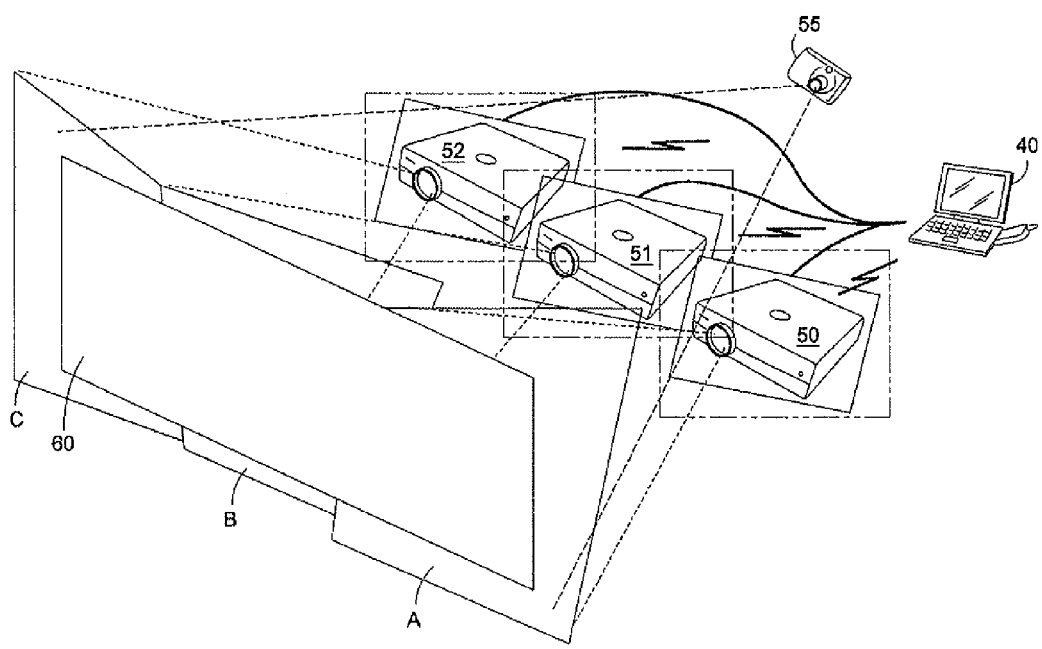
FIG. 1 is a representative view of a multiprojector system relevant to one example embodiment.

FIG. 1 is a representative view of a multiprojector system 100 including a projector array comprised of projectors 50 to 52, a host computer 40 and camera 55, relevant to one example embodiment. Host computer 40 generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Host computer 40 includes a color monitor including a display screen, a keyboard for entering text data and user commands, and a pointing device. Pointing device preferably comprises a mouse for pointing and for manipulating objects displayed on the display screen.

Host computer 40 also includes computer-readable memory media such as a computer hard disk and a DVD disk drive, which are constructed to store computer-readable information such as computer-executable process steps. The DVD disk drive provides a means whereby the host computer can access information, such as image data, computer-executable process steps, application programs, etc. stored on removable memory media. In an alternative, information can also be retrieved through other computer-readable media such as a USB storage device connected to a USB port, or through a network interface. Other devices for accessing information stored on removable or remote media may also be provided.

Host computer 40 may acquire image data from other sources such as a digital camera, a local area network or the Internet via a network interface. Likewise, host computer 40 may interface with color output devices other than projectors 50 to 52, such as color output devices accessible over the network interface.

Host computer 40 acquires image data for an input image, and provides pre-distorted image data to each of projectors 50 to 52 such that corresponding image 60 is displayed on a projection surface with reduced keystone distortion. In addition, the image data is provided for display by projectors 50 to 52 such that the image 60 is displayed at its largest size while maintaining the aspect ratio of the image and displaying the images at a single centralization point based on a first displayed image in a sequence of images.

In this example, projectors 50 to 52 are RGB or RGBW projectors, such as DLP™ digital projectors or other display devices that project images in accordance with image data from the host computer 40 onto a projection surface. Projectors 50 to 52 may be HDR devices capable of projecting HDR images, and may further include, for example, LCD projectors, LCOS projectors, LED projectors.

Together, projectors 50 to 52 make up a projector array, and in accordance with image data received from host computer 40, projectors 50 to 52 project image 60 onto a projection screen by using additive light combinations of red (R), green (G) and blue (B) colorant lights. In addition, and particularly in a case of an HDR device, projectors 50 to 52 also use a white (W) light so as to increase the brightness/luminance of projected images and thereby project HDR images with good fidelity over a large dynamic range.

Digital color camera 55 is an example of a color input device, and is provided for sending digital image data to host computer 40. In particular, digital color camera 55 captures images of the projection surface of the projector array in order to facilitate control of the multiprojector system.

FIG. 1 shows an example of a projector array where projectors 50 to 52 are positioned to form one single image 60. As shown in FIG. 1, projector 50 displays individual projection area A, projector 51 displays individual projection area B and projector 52 displays individual projection area C. In other words, individual projection areas A, B and C are respectively displayed by projectors 50, 51 and 52. In this example, image data is provided by host computer 40 such that each of projectors 50 to 52 displays the appropriate portion of image 60 on the single object on the projection surface.

Figure 2:
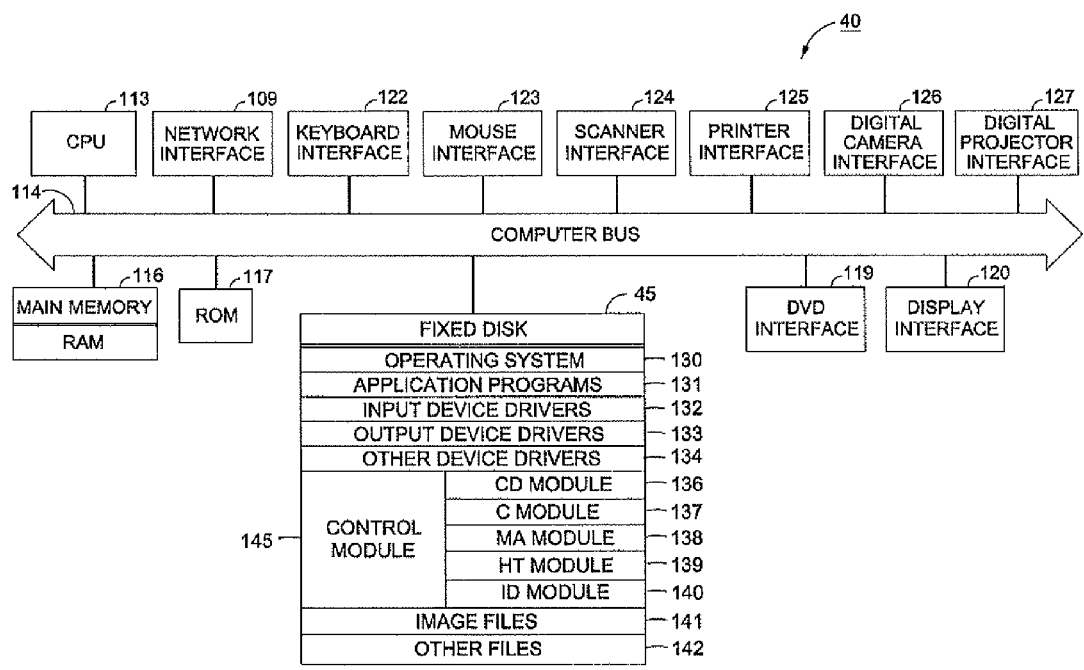
FIG. 2 is a detailed block diagram depicting the internal architecture of the host computer shown in FIG. 1.

FIG. 2 is a detailed block diagram showing the internal architecture of host computer 40. As shown in FIG. 2, host computer 40 includes central processing unit (CPU) 113 which may be a multi-core CPU and which interfaces with computer bus 114. Also interfacing with computer bus 114 are fixed disk 45, network interface 109, random access memory (RAM) 116 for use as a main run-time transient memory, read only memory (ROM) 117, DVD disk interface 119, display interface 120 for a monitor, keyboard interface 122 for a keyboard, mouse interface 123 for a pointing device, digital projector interface 124 for projector 50, digital projector interface 125 for projector 51, digital projector interface 126 for projector 52, and digital camera interface 127 for digital camera 55.

RAM 116 interfaces with computer bus 114 so as to provide information stored in RAM 116 to CPU 113 during execution of the instructions in software programs such as an operating system, application programs, control modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, fixed disk 45 stores computer-executable process steps for operating system 130, and application programs 131, such as graphic image management programs. Fixed disk 45 also stores computer-executable process steps for device drivers for software interface to devices, such as input device drivers 132, output device drivers 133, and other device drivers 134, such as drivers for projectors 50, 51 and 52. Image files 141, including color image files, and other files 142 are available for output to color output devices and for manipulation by application programs.

Control module 145 comprises computer-executable process steps executed by a computer for control of a multiprojector system, where the multiprojector system includes multiple projectors arranged in a projector array. Control module 145 controls the multiprojector system such that an image is projected into a projection area on a projection surface. Briefly, control module 145 controls the projector array so that a first image is projected in a first maximum area rectangle at a first aspect ratio of the first image. A centralization point of the first maximum area is determined. The first image is projected into the projection area centered at the centralization point. A second image is projected in a second maximum area rectangle at a second aspect ratio of the second image. The second image is projected into the projection area centered at the centralization point.

As shown in FIG. 2, control module 145 includes, at least, computer-executable process steps for plural modules of this embodiment, including corner detection (CD) module 135, centralization (C) module 137, maximum area (MA) module 138, homography transformation (HT) module 139 and image display (ID) module 140.

Corner detection (CD) module 135 is constructed to detect a corner of each individual projection area projected by each of projectors 50 to 52 in order to determine the projection area on the projection surface. For example, in the example shown in FIG. 1, CD module is constructed to detect the corners of individual projection areas A, B and C corresponding, respectively, to projectors 50, 51 and 52 of the projector array. The corners of the individual projection areas are detected by causing digital camera 55 to capture an image of each individual projection area projected by each of the projectors in the projector array, and analyzing the captured image. A virtual Cartesian coordinate system can be used to designate the coordinates of the corners and the boundaries of the projection area connecting the corners. The boundary of the projection area will then be used as a limit on the maximum size of the displayed images within the projection area.

Maximum area (MA) module 138 is constructed to identify the aspect ratio of each input image that is to be displayed by the projector array and is also constructed to calculate the coordinates of a maximum area rectangle available within the projection area detected by the CD module 135. The maximum area rectangle is determined in which a respective input image can be displayed at its largest size within the projection area at the aspect ratio detected and centered at a centralization point designated by the centralization module 137, described below. For the second and subsequent input images in a sequence of images, the maximum area rectangle is further modified by scaling it up or down to center the respective maximum area rectangle about the centralization point designated by the centralization module 137. The maximum area rectangle is scaled up or down based on the aspect ratio of the image so that the area of the rectangle is maximized to fit within the projection area detected by the CD module while being centered at the centralization point designated by the centralization module 137.

Centralization (C) module 137 is constructed to designate a centralization point around which the first maximum area rectangle, corresponding to the first input image, and all subsequent maximum area rectangles, corresponding to subsequent input images, are centered during display of those respective images. C module 137 provides the centralization point to the MA module to determine the maximum area rectangle.

Homography transformation (HT) module 139 is constructed to derive homography transformations for projectors 50 to 52 in order to facilitate keystone correction. HT module 139 derives a homography transformation, and an inverse of the derived homography transformation, for each of the projectors involved in the projection of each projected image. The inverse homography transformation is output to the HT module for keystone correction of the input image.

Image display (ID) module 140 is constructed to calculate a modified image based upon the output from the HT module, the MA module, and the input image itself. Such a modified image is to be the largest image to fit within the projection area at the aspect ratio of the input image and be centered at the designated centralization point. ID module 140 provides the modified image data to each of the projectors 50 to 52 for display on the projection surface.

The computer-executable process steps for control module 145 may be configured as a part of operating system 130, as part of an output device driver such as a projector driver, or as a stand-alone application program such as a multiprojector management system. They may also be configured as a plug-in or dynamic link library (DLL) to the operating system, device driver or application program. For example, control module 145 according to example embodiments may be incorporated in an output device driver for execution in a computing device, such as a projector driver, embedded in the firmware of an output device, such as a projector, or provided in a stand-alone application for use on a general purpose computer. In one example embodiment, control module 145 is incorporated directly into the operating system for general purpose host computer 40. It can be appreciated that the present disclosure is not limited to these embodiments and that the disclosed control module may be used in other environments in which control of a multiprojector system is desired.

Figure 3:
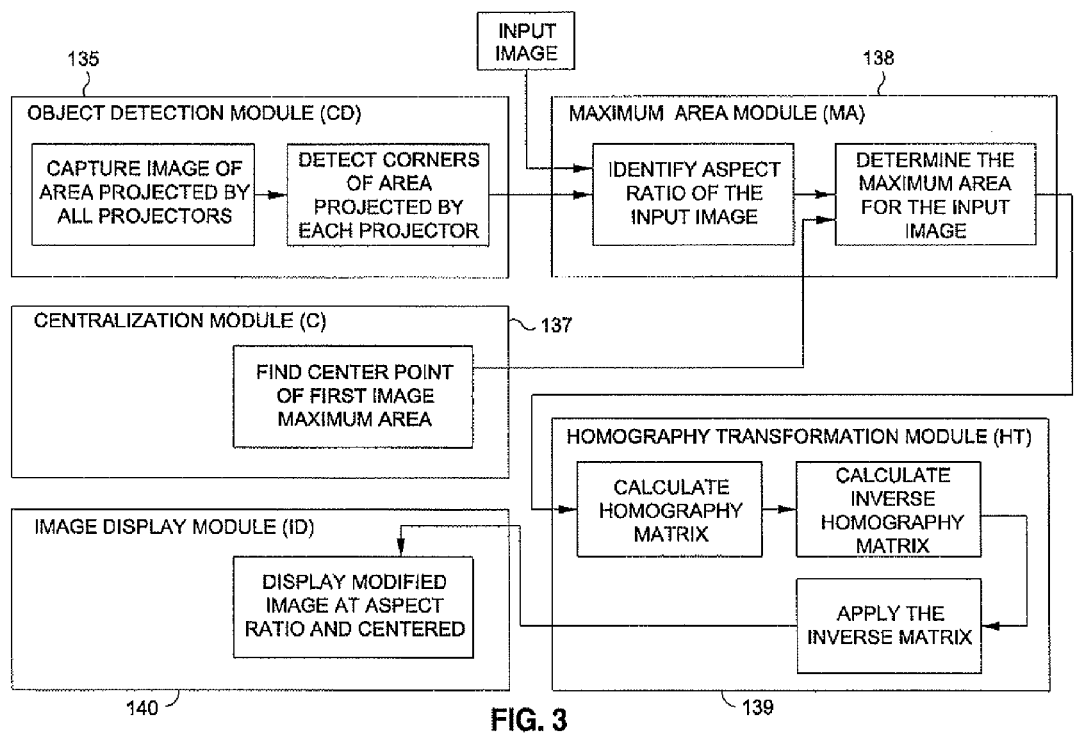
FIG. 3 is a view for explaining software architecture of a control module for a multiprojector system according to an example embodiment.

FIG. 3 is a view for explaining software architecture of control module 145 for a multiprojector system according to an example embodiment. As shown in FIG. 3, CD module 135 controls the multiprojector system such that an image is captured of a projection area projected by all projectors 50 to 52, and analyzes that captured image in order to determine the extent of the projection area on the projection surface. In particular, CD module outputs coordinates for each of the corners of each of the individual projection areas displayed by projectors 50 to 52, and corners caused by overlapping individual projection areas.

In this embodiment, the corners of each of the individual projection areas, such as areas A, B and C in FIG. 1, on the projection surface are detected by analyzing the captured image using, for example, a Canny algorithm to determine the coordinates of each of the corners of the individual projection areas. Of course, any other suitable method of determining the extent of the projection area on a projection surface may be used.

MA module 138 accepts, as input, the coordinates of the corners of each individual projection area, the input image data, and the centralization point (if already determined). The input image data includes the aspect ratio of the input image. The MA module 138 uses the input image data to determine the aspect ratio of each input image. The MA module also receives an input from centralization module 137. The input from the centralization module includes data of a centralization point. Based on the input image data, the output of the CD module 135, and output from the C module 137, the MA module 138 determines and outputs to the HT module 139 and the ID module 140, coordinates of a maximum area rectangle. The maximum area rectangle is a rectangle defined by coordinates in which an image can be displayed within the projection area at its maximum size at the aspect ratio of the input image, while being centered about the centralization point. More specifically, MA module 138 comprises computer-executable process steps to calculate the coordinates of a maximum area rectangle for each image on the projection surface, taking into account the individual aspect ratios of each input image, such that the image is displayed in a maximum area within the projection area in accordance with the aspect ratio of the input image 300, while being centered about the centralization point.

In particular, in this embodiment, the maximum area is calculated by using a rectangle having the same aspect ratio as input image. Based in part on the coordinates of the corners and coordinates of the projection area, the edges of each maximum area rectangle are determined. For example, a system of linear equations can be used to solve for the coordinates of the corners of the rectangle resulting in dimensions of length and width that maximize the area of the rectangle. In such a case, the length and width will be related by the aspect ratio. Other constraints on the system of equations are the locations of the corners of the projection area, which can be mapped to a Cartesian coordinate system. Alternatively, the length and width of the maximum area rectangle that minimizes the difference of the total area of the projection area and the area of the rectangle can also be determined. When a centralization point has already been determined by the C module and is input to the MA module, an additional constraint is added which requires that the center of the maximum area rectangle be at the centralization point. The addition of the centralization point constraint simplifies the system of equations. While the above-discussed process has been provided here as an example, any suitable method of determining the maximum area for display may be used.

HT module 139 accepts, as input, the coordinates of the corners of the maximum area rectangle determined by the MA module along with the input image data and aspect ratio. Based on these inputs, HT module 139 outputs a modified image for display by projectors 50 to 52.

More specifically, HT module 139 comprises computer-executable process steps to derive homography transformations for each of the input images provided to projectors 50 to 52 in order to facilitate keystone correction. HT module 139 derives a homography transformation, and an inverse of the derived homography transformation, for each of the projectors involved in the projection of the image.

ID module 140 accepts, as input, the coordinates indicating the maximum area on which an image can be displayed within an object from MA module 138, and modified images from HT module 139. Based on these inputs, ID module 140 outputs pre-distorted images to each of projectors 50 to 52 in the projector array, such that each projector displays the appropriate portion of the image on the maximum area on the projection surface, and such that the image is substantially the largest image possible given the extent of the projection area, the centralization point, and the aspect ratio of the input image.

More specifically, ID module 140 comprises computer-executable process steps to cause projectors 50 to 52 to form keystone corrected image 60 corresponding to the input image. ID module 140 provides image data which has been adjusted by HT module 139 to each of the projectors 50 to 52 for display based on the maximum area calculated by MA module 138 for each image. In particular, ID module 140 scales and shifts each modified image to adjust those images for display in the maximum area.

Figure 4:
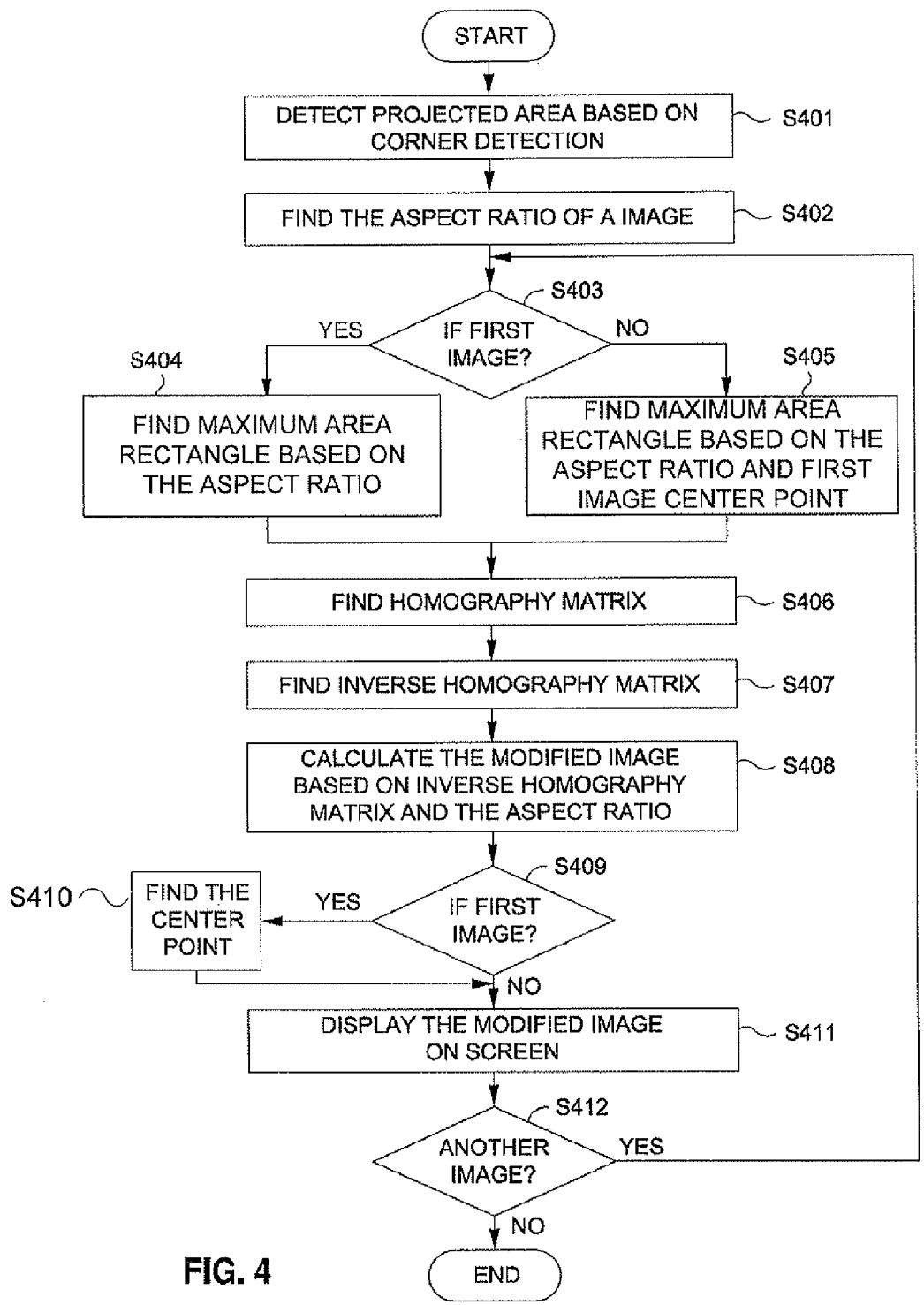
FIG. 4 is a flow diagram for explaining control of a multiprojector system according to an example embodiment.

FIG. 4 is a flow diagram for explaining control of a multiprojector system according to an example embodiment. The process steps shown in FIG. 4 are computer-executable process steps stored on a computer-readable memory medium such as at 145 on fixed disk 45, and are executed by CPU 113 of host computer 40, so as to implement a control module for control of a multiprojector system including multiple projectors arranged in a projector array. Briefly, according to the process steps shown in FIG. 4, a projection area is detected by corner detection using an image capture device which captures an image of the projection surface. The first image is keystone corrected and is projected in a first maximum area rectangle having a first aspect ratio of the first image. A centralization point is designated as the center of the maximum area rectangle of the first image. A second, or subsequent, image is keystone corrected and is projected in a second maximum area rectangle having a second aspect ratio of the second image, wherein the second image is projected into the projection area centered at the centralization point.

In more detail, in step S401, CD module 135 captures an image of the projection area displayed by all of the projectors in the projector array, and analyzes the captured image using a Canny algorithm in order to detect the extent of the projection area.

In step 402, the aspect ratio of an input image is determined based upon the input image data. Then, in if it is detected that the input image is the first image in a sequence of images ("YES" at S403), a maximum area rectangle is determined in step S404 based on the aspect ratio of the image and the projection area. On the other hand, if it is detected that the input image is not the first image in a sequence of images ("NO" at S403), a maximum area rectangle is determined in step S405 based on the aspect ratio of the image, the projection area, and a centralization point determined from the centralization module. In step S406, a homography matrix is derived for the image to be displayed by each of the projectors involved in the projection of the image. In step S407, an inverse homography matrix is derived from the homography matrix derived in step S406 and are output to the image display module. In step S408 the coordinates of the keystone corrected modified image are calculated by the homography transform module 139.

In step S409 it is determined whether or not the modified image corresponds to the first image in a sequence of images. If the modified image is corresponds to the first input image ("YES", at S409), then in step S410 the centralization point is determined by the centralization module 137 from the maximum area rectangle determined in step S404. The centralization point determined in step S410 is used as the location of the center of subsequent projected images as well as the center of the projected first image.

On the other hand, if the modified image does not correspond to the first input image ("NO", at S409), then the maximum area rectangle is centered about the centralization point and the maximum area rectangle is determined by the maximum area module 138 based on the aspect ratio of the input image, the centralization point determined from the first image in step S410, and the projection area.

In step S411 ID module 140 scales and shifts the keystone corrected images for display based on the maximum area rectangle and the centralization point. Each modified image is displayed by each of projectors 50 to 52 to form image 60 in step S411.

Figure 5A:
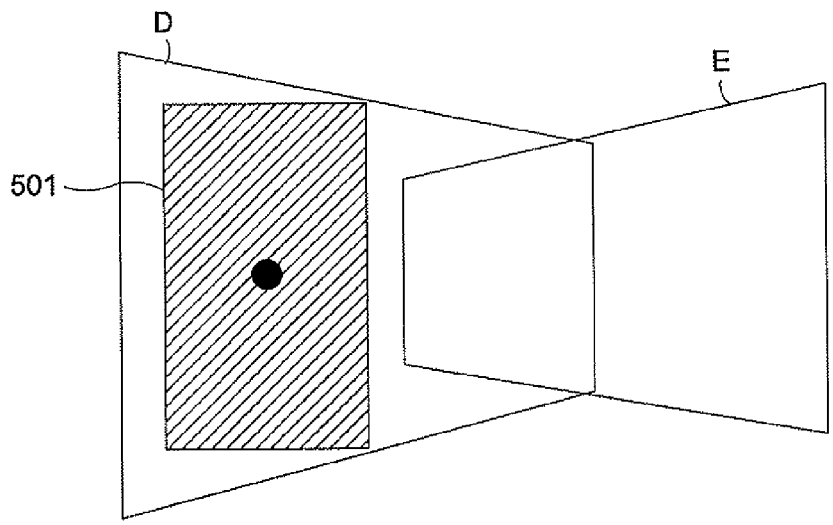
FIGS. 5A and 5B show, schematically, an example of a series of projected images according to the flow diagram shown in FIG. 4.
Figure 5B:
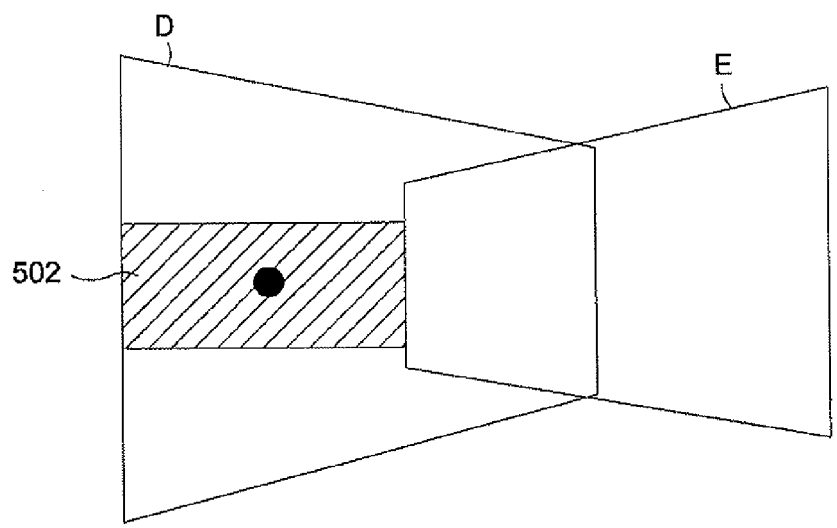

FIGS. 5A and 5B show, schematically as a progression, views of two images showing how the maximum area rectangle is determined in accordance with the control steps shown in FIG. 4 and described above. In particular, FIG. 5A shows the display of the first modified image in the first image maximum area rectangle 501 in accordance with step S411. The first image maximum area rectangle 501 is positioned in a projection area formed by two overlapping individual projection areas, D and E. The first maximum area rectangle 501 is centered at a centralization point, shown as a solid circle, and determined in step S410.

After the first maximum area rectangle 501 is determined, it is determined that a second input image exists to be displayed, in accordance with step S412. The aspect ratio of the second input image is determined in accordance with step S402 and a second maximum area rectangle 502 is determined in accordance with step S405. The second maximum area rectangle 502 is determined to be centered at the centralization point and is scaled up around the centralization point maintaining the aspect ratio of the second input image. The second maximum area rectangle 502 is scaled up to its largest size while remaining completely within the projection area.

As a result of the scaling of the second maximum area rectangle 502 shown in FIG. 5B, a second keystone corrected image can be displayed in the projection area at its largest size while being centered at the centralization point, which is common to the first modified image. Displaying the second keystone corrected image at its aspect ratio and centralizing the second image at a single centralization point are intended to reduce the perception by the viewer that the sequence of images jump around different parts of the projection surface and that the images are distorted in size.

Figure 5C:
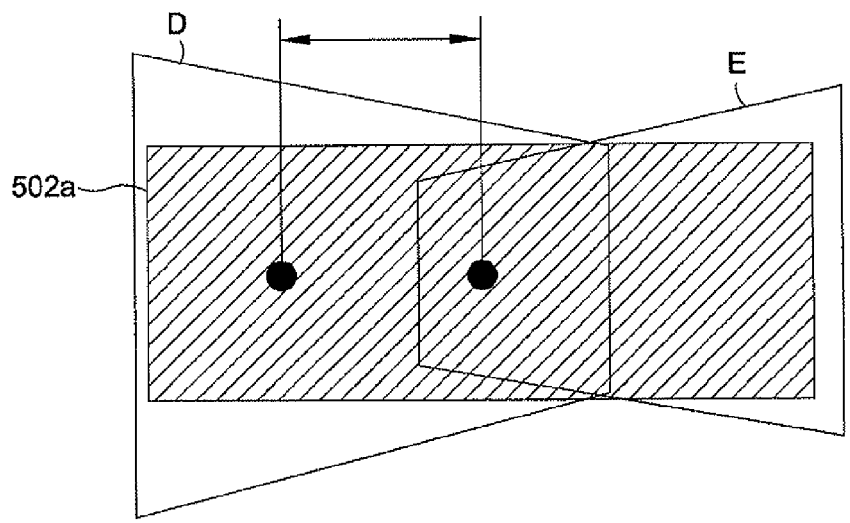
FIG. 5C shows, schematically, an example showing the determination of a second or a subsequent maximum area rectangle not in accordance with the flow diagram of FIG. 4.

By way of contrast, FIG. 5C illustrates an example in which the second maximum area rectangle is determined without centering the second maximum area around the centralization point shown in FIGS. 5A and 5B. In this example, the center of the second maximum area rectangle, and subsequent maximum area rectangles are not required to be coincident with the first maximum area rectangle. Therefore, as shown in FIG. 5C, a second maximum area rectangle 502a is determined in similar manner as the first maximum area rectangle 501. However, the center of the resulting second maximum area rectangle 502a is not coincident with the centralization point shown in FIGS. 5A and 5B. When the second keystone corrected image is projected in this second maximum area rectangle 502a, the center point of that second keystone corrected image will appear to have shifted or jumped when compared to the immediately preceding image, i.e., the first keystone corrected image. This shift in the center points is shown in FIG. 5C by the horizontal arrow showing the distance between the centralization point shown in FIGS. 5A and 5B and the center of the second maximum area rectangle 502a. Such an appearance of projected images jumping is distracting to viewers.

Accordingly, according to the example embodiments described herein, to mitigate the appearance of projected image jumping, the second maximum area rectangle 502 is determined by maintaining its center at the centralization point determined based on the first maximum area rectangle 501, as discussed above in connection with FIGS. 5A and 5B.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of displaying images with a projector array, wherein the projector array comprises a plurality of projectors, which together, project the images into a projection area on a projection surface, the method comprising:
   determining a first maximum area rectangle in the projection area at a first aspect ratio corresponding to a first image;
   identifying the center of the first maximum area rectangle as a centralization point responsive to the determination of the first maximum area rectangle;
   projecting the first image in the first maximum area rectangle, wherein the first image is projected into the projection area centered at the centralization point;
   determining a second maximum area rectangle in the projection area at a second aspect ratio corresponding to a second image, wherein the second maximum area rectangle is determined independently of any boundaries defined by the first maximum area rectangle, by calculations using the second aspect ratio of the second image and the centralization point so as to result in a substantially maximum area within the projection area centered at the centralization point; and
   projecting the second image in the second maximum area rectangle at the second aspect ratio of the second image, wherein the second image is projected into the projection area centered at the centralization point;
   wherein the second maximum area rectangle determined is smaller than a third maximum area rectangle at the second aspect ratio that is maximized within the projection area about a center point that is not the centralization point.

2. The method according to claim 1, further comprising:
   detecting the projection area by corner detection using an image capture device which captures an image of the projection surface.

3. The method according to claim 1, further comprising:
   determining a first homography matrix based on the determination of the first maximum area rectangle;
   applying a first inverse homography matrix transform to the first homography matrix;
   obtaining a first homography-transformed image of the first image based on the first inverse homography matrix and the first aspect ratio;
   determining a second homography matrix based on the determination of the second maximum area rectangle;
   applying a second inverse homography matrix transform to the second homography matrix; and
   obtaining a second homography-transformed image of the second image based on the second inverse homography matrix and the second aspect ratio.

4. The method according to claim 1, wherein the second maximum area rectangle is calculated independently of the first maximum area rectangle and differs from the first maximum area rectangle when the first and second aspect ratios differ.

5. A control module for a multiprojector system, wherein the multiprojector system comprises multiple projectors arranged in a projector array, the module comprising:
   a maximum area module constructed to determine a first maximum area rectangle in a projection area at a first aspect ratio corresponding to a first image;
   a centralization module constructed to identify the center of the first maximum area rectangle as a centralization point responsive to the determination of the first maximum area rectangle;
   an image display module constructed to display the first image in the first maximum area rectangle, wherein the first image is projected into the projection area centered at the centralization point;
   wherein the maximum area module is further constructed to determine a second maximum area rectangle in the projection area at a second aspect ratio corresponding to a second image, wherein the second maximum area rectangle is determined independently of any boundaries defined by the first maximum area rectangle, by calculations using the second aspect ratio and the centralization point, so as to result in a substantially maximum area within the projection area centered at the centralization point;
   wherein the image display module is further constructed to display the second image in the second maximum area rectangle at the second aspect ratio of the second image, wherein the second image is projected into the projection area centered at the centralization point; and
   wherein the second maximum area rectangle determined is smaller than a third maximum area rectangle at the second aspect ratio that is maximized within the projection area about a center point that is not the centralization point.

6. The control module of claim 5, further comprising:
   a corner detection module constructed to detect the projection area by corner detection using an image capture device which captures an image of a projection surface; and
   a homography transformation module constructed to determine a first homography matrix based on the determination of the first maximum area rectangle by the maximum area module, to apply a first inverse homography matrix transform to the first homography matrix, to obtain a first homography-transformed image of the first image based on the first inverse homography matrix and the first aspect ratio, and to determine a second homography matrix based on the determination of the second maximum area rectangle by the maximum area module, to apply a second inverse homography matrix transform to the second homography matrix, and to obtain a second homography-transformed image of the second image based on the second inverse homography matrix and the second aspect ratio.

7. The control module according to claim 5, wherein the second maximum area rectangle is calculated independently of the first maximum area rectangle and differs from the first maximum area rectangle when the first and second aspect ratios differ.

8. A projector array display apparatus comprising:
   a processor with an interface to a projector array, wherein the projector array comprises a plurality of projectors, which together, project the images into a projection area on a projection surface; and a memory storing a program executable by said processor, wherein the program causes the processor to implement a method of displaying images with the projector array, wherein the method includes the steps of:

determining a first maximum area rectangle in the projection area at a first aspect ratio corresponding to a first image;

identifying the center of the first maximum area rectangle as a centralization point responsive to the determination of the first maximum area rectangle;

projecting the first image in the first maximum area rectangle, wherein the first image is projected into the projection area centered at the centralization point;

determining a second maximum area rectangle in the projection area at a second aspect ratio corresponding to a second image, wherein the second maximum area rectangle is determined independently of any boundaries defined by the first maximum area rectangle, by calculations using the second aspect ratio of the second image and the centralization point so as to result in a substantially maximum area within the projection area centered at the centralization point; and projecting the second image in the second maximum area rectangle at the second aspect ratio of the second image, wherein the second image is projected into the projection area centered at the centralization point;

wherein the second maximum area rectangle determined is smaller than a third maximum area rectangle at the second aspect ratio that is maximized within the projection area about a center point that is not the centralization point.

9. The apparatus according to claim 8, wherein the program stored in the memory further causes the processor to implement a method further including the step of:

detecting the projection area by corner detection using an image capture device which captures an image of the projection surface.

10. The apparatus according to claim 8, wherein the program stored in the memory further causes the processor to implement a method further including the steps of:

determining a first homography matrix based on the determination of the first maximum area rectangle;

applying a first inverse homography matrix transform to the first homography matrix;

obtaining a first homography-transformed image of the first image based on the first inverse homography matrix and the first aspect ratio;

determining a second homography matrix based on the determination of the second maximum area rectangle;

applying a second inverse homography matrix transform to the second homography matrix; and obtaining a second homography-transformed image of the second image based on the second inverse homography matrix and the second aspect ratio.

11. The apparatus according to claim 8, wherein the second maximum area rectangle is calculated independently of the first maximum area rectangle and differs from the first maximum area rectangle when the first and second aspect ratios differ.

12. A non-transitory computer readable storage medium having stored thereon a plurality of computer-executable instructions, the plurality of instructions when executed by a processor, cause the processor to perform a method of displaying images with a projector array, wherein the projector array comprises a plurality of projectors, which together, project the images into a projection area on a projection surface, the method comprising steps of:

determining a first maximum area rectangle in the projection area at a first aspect ratio corresponding to a first image;

identifying the center of the first maximum area rectangle as a centralization point responsive to the determination of the first maximum area rectangle;

projecting the first image in the first maximum area rectangle, wherein the first image is projected into the projection area centered at the centralization point;

determining a second maximum area rectangle in the projection area at a second aspect ratio corresponding to a second image, wherein the second maximum area rectangle is determined independently of any boundaries defined by the first maximum area rectangle, by calculations using the second aspect ratio of the second image and the centralization point so as to result in a substantially maximum area within the projection area centered at the centralization point; and projecting the second image in the second maximum area rectangle at the second aspect ratio of the second image, wherein the second image is projected into the projection area centered at the centralization point;

wherein the second maximum area rectangle determined is smaller than a third maximum area rectangle at the second aspect ratio that is maximized within the projection area about a center point that is not the centralization point.

13. The non-transitory computer readable storage medium according to claim 12, wherein the method further comprises the step of:

detecting the projection area by corner detection using an image capture device which captures an image of the projection surface.

14. The non-transitory computer readable storage medium according to claim 12, wherein the method further comprises the steps of:

determining a first homography matrix based on the determination of the first maximum area rectangle;

applying a first inverse homography matrix transform to the first homography matrix;

obtaining a first homography-transformed image of the first image based on the first inverse homography matrix and the first aspect ratio;

determining a second homography matrix based on the determination of the second maximum area rectangle;

applying a second inverse homography matrix transform to the second homography matrix; and obtaining a second homography-transformed image of the second image based on the second inverse homography matrix and the second aspect ratio.

15. The non-transitory computer readable storage medium according to claim 12, wherein the second maximum area rectangle is calculated independently of the first maximum area rectangle and differs from the first maximum area rectangle when the first and second aspect ratios differ.

* * * * *